E. S. SUTTON.
MILK PAIL.
APPLICATION FILED APR. 22, 1915.
1,165,555.
Patented Dec. 28, 1915.
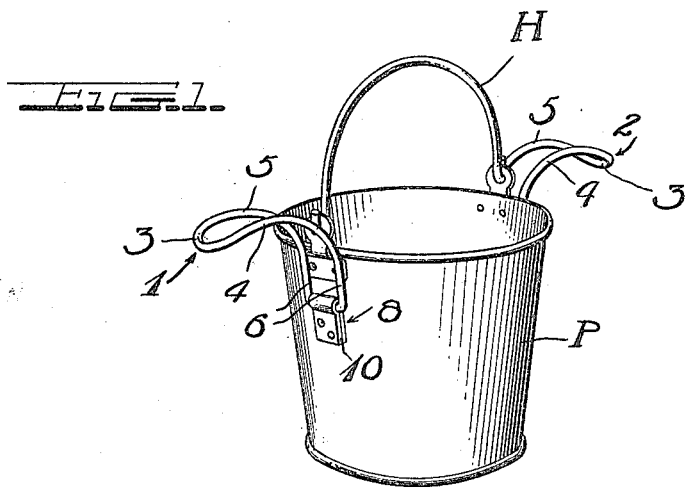
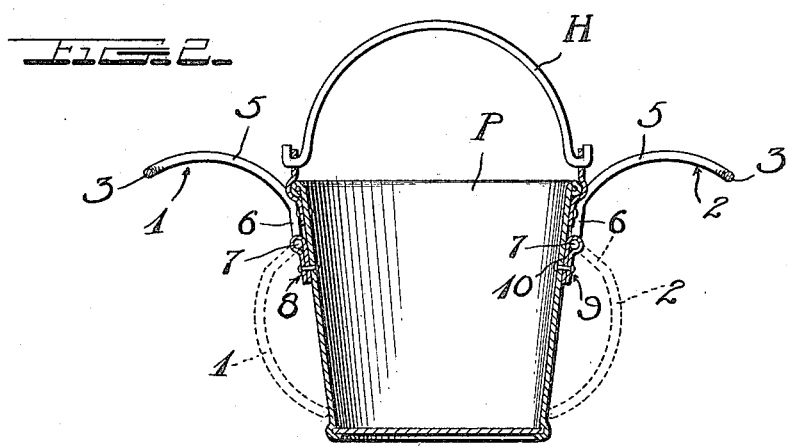
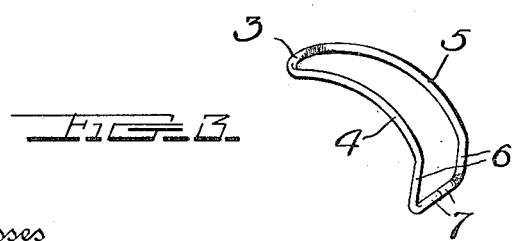
Witnesses
Edwin B. Hunt.
Inventor
E. S. Sutton
by H. B. Willson & Co
Attorneys

UNITED STATES PATENT OFFICE.

EUGENE SILAS SUTTON, OF EVERETT, WASHINGTON.

MILK-PAIL.

1,165,555.  Specification of Letters Patent.  Patented Dec. 28, 1915.

Application filed April 22, 1915. Serial No. 23,204.

*To all whom it may concern:*

Be it known that I, EUGENE S. SUTTON, a citizen of the United States, residing at Everett, in the county of Snohomish and State of Washington, have invented certain new and useful Improvements in Milk-Pails; and I do declare the following to be a full, clear, and exact description of the invention, such as will enable others skilled in the art to which it appertains to make and use the same.

This invention relates to improvements in milk pails and more particularly to supports therefor.

The object of the invention is to provide a milk pail support consisting of a pair of arms pivotally secured at opposite sides of the pail and adapted to be swung up into position for resting upon the knees of the milker as a support for the pail when in use, and adapted to be folded down against the side of the pail out of the way when not in use.

With this and other objects in view, the invention resides in certain novel features of construction and combination and arrangement of parts hereinafter described and claimed.

In the accompanying drawings:—Figure 1 represents a perspective view of a pail equipped with this improved support; Fig. 2 is a side elevation showing the supports in operative position; Fig. 3 is a perspective view of one of the supporting arms detached.

In the embodiment illustrated a pail P is shown having the usual bail shaped handle H. The support contemplated by the present invention comprises two arms 1 and 2 pivotally connected to opposite sides of the pail below the top thereof and which are here shown constructed of heavy wire or metal rods bent intermediately of their ends to form loops 3, the side members 4 and 5 of which are curved longitudinally throughout the greater portion of their length from the looped portion toward their free ends with a flat pail engaging portion 6 arranged adjacent the free ends thereof, said free ends being bent laterally inward at right angles with their terminals 7 disposed in close proximity and which are adapted to form a journal for connecting the supports to the pail. Bearings 8 and 9 are shown mounted on the pail and are here constructed in the form of metal strips 10 folded intermediately of their ends, and said folded portion rounded to form a bearing to receive the journals of the arms 1 and 2, the body portion of the strip and its free ends being connected and riveted or otherwise secured to the pail. In assembling these parts, the side members are sprung apart a sufficient distance to permit the separation of the inturned terminals thereof to permit them to be engaged with the bearings 8 and 9 and when so engaged and these arms 1 and 2 are swung up, the flat portion 6 thereof will contact with the outer faces of the pail and form stops for limiting their upward movement, also braces for said arms, the curved portions of which are adapted to fit over the knees of the milker and thus reliably and comfortably support the pail in position for milking.

From the above description it will be seen that this pail support, while simple in construction and cheap to manufacture, will perform all the functions of a more expensive support and that if desired this support may be readily detached from the pail by simply prying the side members thereof apart and disengaging the inbent terminals from the bearings.

I claim as my invention:—

A pail support comprising a heavy metal rod bent intermediate of its ends to form an arcuate loop with the members thereof arranged parallel and in the same plane, with their terminals bent laterally inward toward each other at right angles and in alinement with each other, the ends of said terminals being in close proximity forming a journal for connection to a pail, the side members of said loop adjacent their free ends being bent laterally at an angle to the concave sides thereof and extended on the same side as the concave faces of said members to form a flat pail engaging member, and a bearing for receiving the journal of said support to connect it to a pail.

In testimony whereof I have hereunto set my hand in presence of two subscribing witnesses.

EUGENE SILAS SUTTON.

Witnesses:
  A. M. ASTON,
  WM. PAYNE.

Copies of this patent may be obtained for five cents each, by addressing the "Commissioner of Patents, Washington, D. C."